US008095255B2

United States Patent
Ebuchi et al.

(10) Patent No.: US 8,095,255 B2
(45) Date of Patent: Jan. 10, 2012

(54) CONTROL APPARATUS FOR HYBRID VEHICLE

(75) Inventors: Hiroaki Ebuchi, Susono (JP);
Hiromichi Kimura, Okazaki (JP);
Hirotatsu Kitabatake, Susono (JP);
Takaji Umeno, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 389 days.

(21) Appl. No.: 12/500,958

(22) Filed: Jul. 10, 2009

(65) Prior Publication Data
US 2010/0023193 A1 Jan. 28, 2010

(30) Foreign Application Priority Data
Jul. 23, 2008 (JP) ................................. 2008-189824

(51) Int. Cl.
*G06F 19/00* (2006.01)
*B60L 9/00* (2006.01)
*B60L 11/00* (2006.01)

(52) U.S. Cl. .... 701/22; 707/67; 180/65.21; 180/65.265; 903/917; 74/335; 74/661; 477/39; 477/180; 477/7; 477/176; 475/5

(58) Field of Classification Search .................... 701/22, 701/51, 67; 180/65.21, 65.265; 903/917, 903/902; 74/335, 661; 477/39, 180, 7, 176; 475/5
See application file for complete search history.

(56) References Cited

U.S. PATENT DOCUMENTS

| 2007/0056784 | A1* | 3/2007 | Joe et al. ..................... 180/65.2 |
| 2007/0186632 | A1* | 8/2007 | Endo et al. .................. 73/118.1 |
| 2007/0275823 | A1* | 11/2007 | Motosugi et al. ............ 477/176 |
| 2008/0135314 | A1* | 6/2008 | Motoike et al. .............. 180/65.2 |
| 2008/0236911 | A1* | 10/2008 | Yamamoto et al. ......... 180/65.2 |
| 2009/0137361 | A1* | 5/2009 | Matsubara et al. ............... 477/3 |
| 2009/0227407 | A1* | 9/2009 | Kamada et al. .................. 475/5 |
| 2009/0229393 | A1* | 9/2009 | Shibata et al. ................. 74/335 |

FOREIGN PATENT DOCUMENTS

| JP | 9-308281 | 11/1997 |
| JP | 2001-1779 | 1/2001 |
| JP | 2001-171369 | 6/2001 |
| JP | 2004-525326 | 8/2004 |
| JP | 2005-278225 | 10/2005 |
| JP | 2006-57703 | 3/2006 |

* cited by examiner

*Primary Examiner* — Ronnie Mancho
(74) *Attorney, Agent, or Firm* — Oblon, Spivak, McClelland, Maier & Neustadt, L.L.P.

(57) ABSTRACT

In a hybrid vehicle provided with a power dividing mechanism comprising a clutch mechanism, an ECU performs speed-change control. In the control, the ECU performs an engage preparing process if it is necessary to engage clutch plates of the clutch mechanism with each other. In the process, the ECU switches a reference value which is referred in a feedback control for performing a rotation synchronization and a position synchronization for the clutch plates from a calculated value which is calculated from a pulse signal of first rotational sensor mounted the clutch plate to an estimated value which is estimated from a pulse signal of each of second and third rotational sensors for detecting rotational speed of each motor generators if clutch rotational speed as rotational speed corresponding to the clutch plate as an engagement element decreases to less than a criterion value.

4 Claims, 8 Drawing Sheets

[FIG. 1]
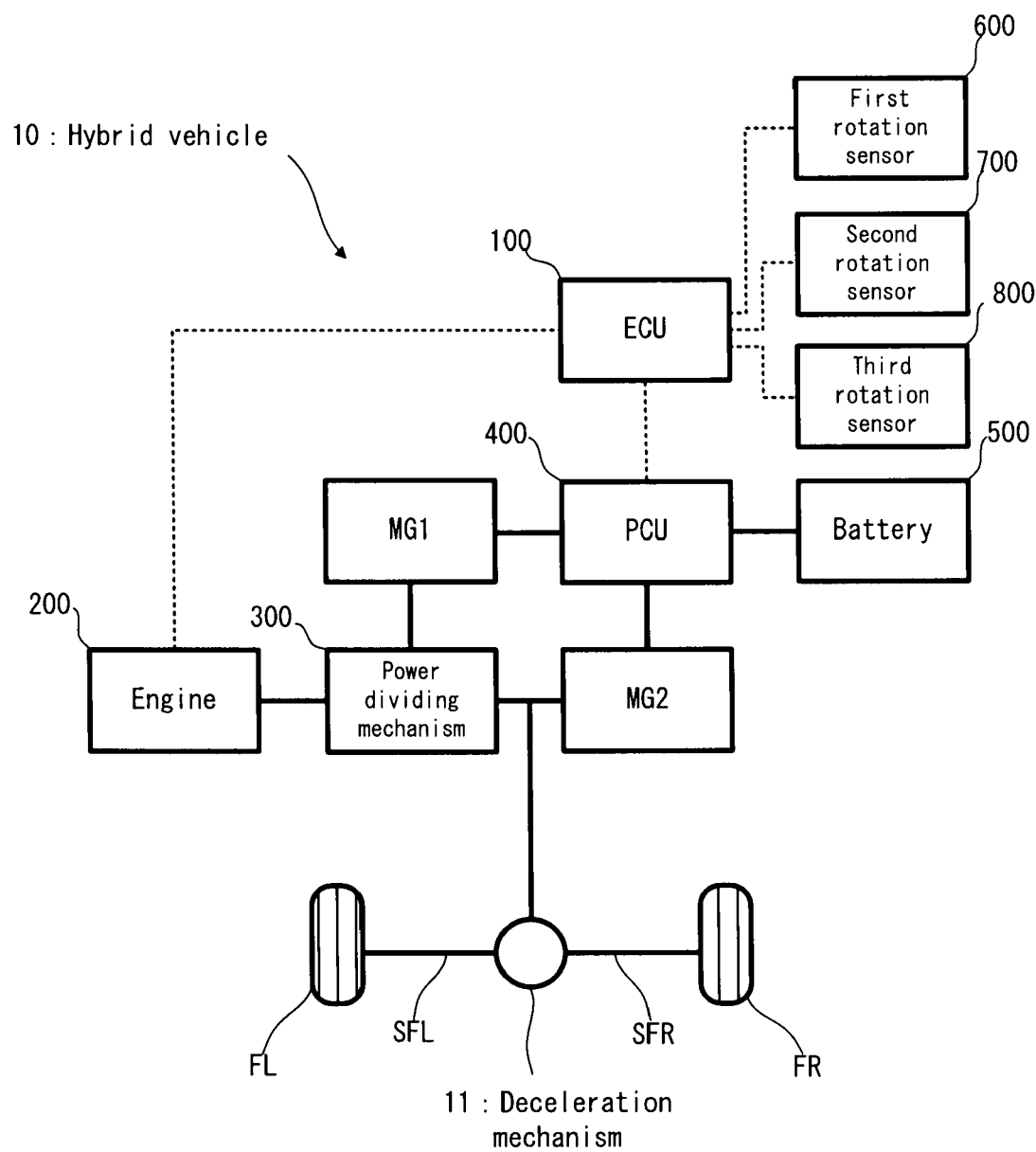

[FIG. 2]
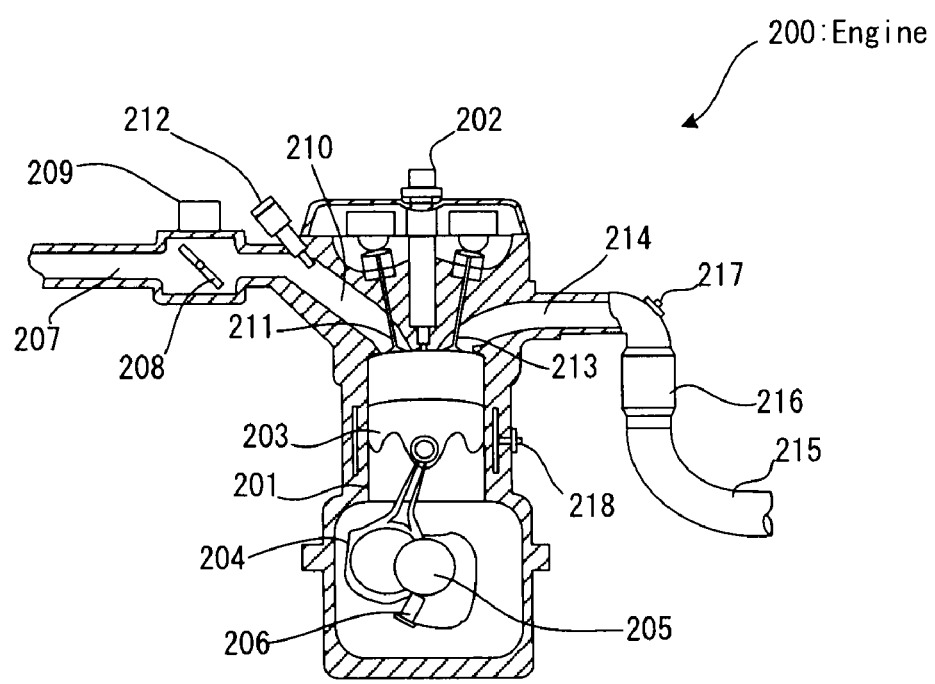

[FIG. 3]
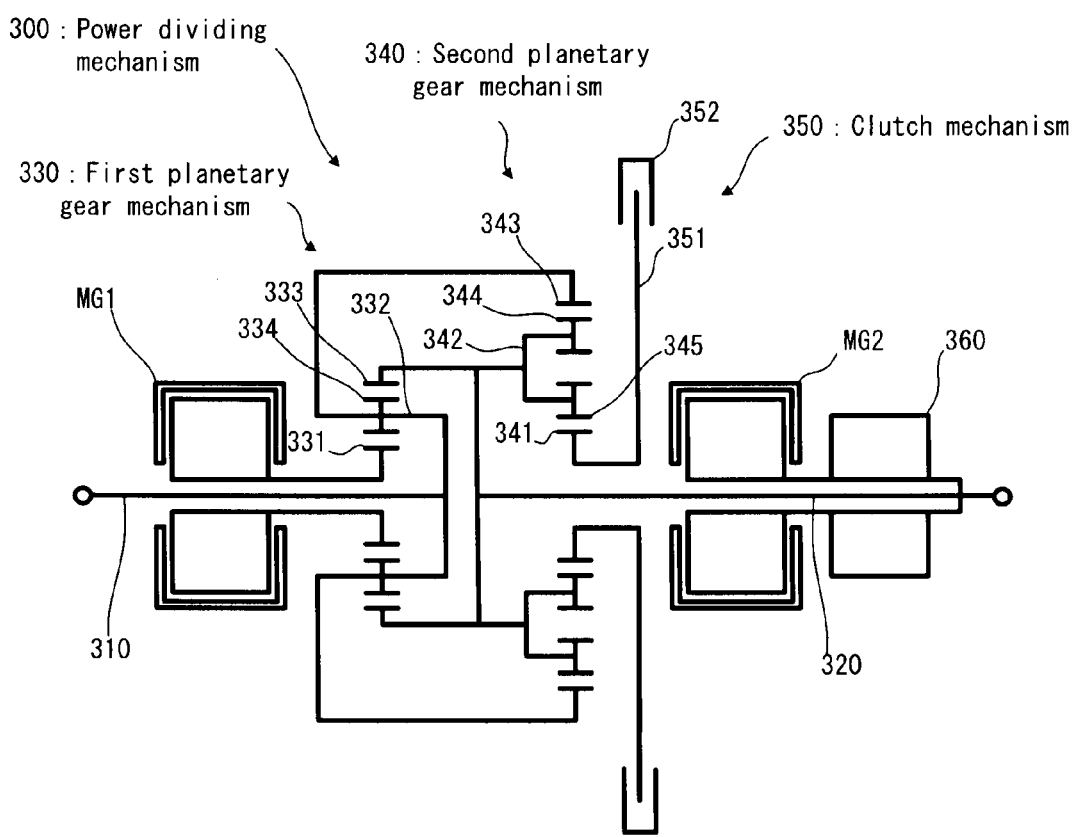

[FIG. 4]
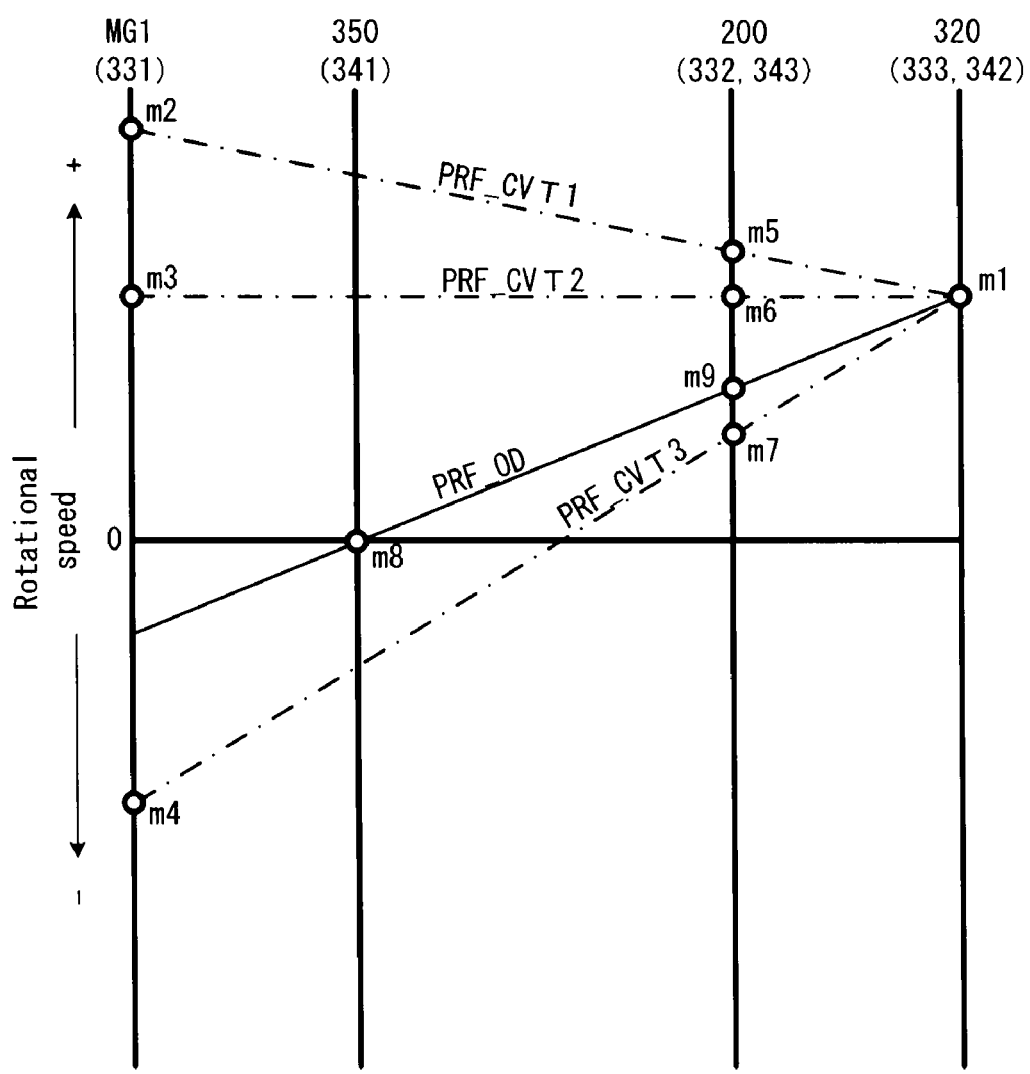

[FIG. 5]
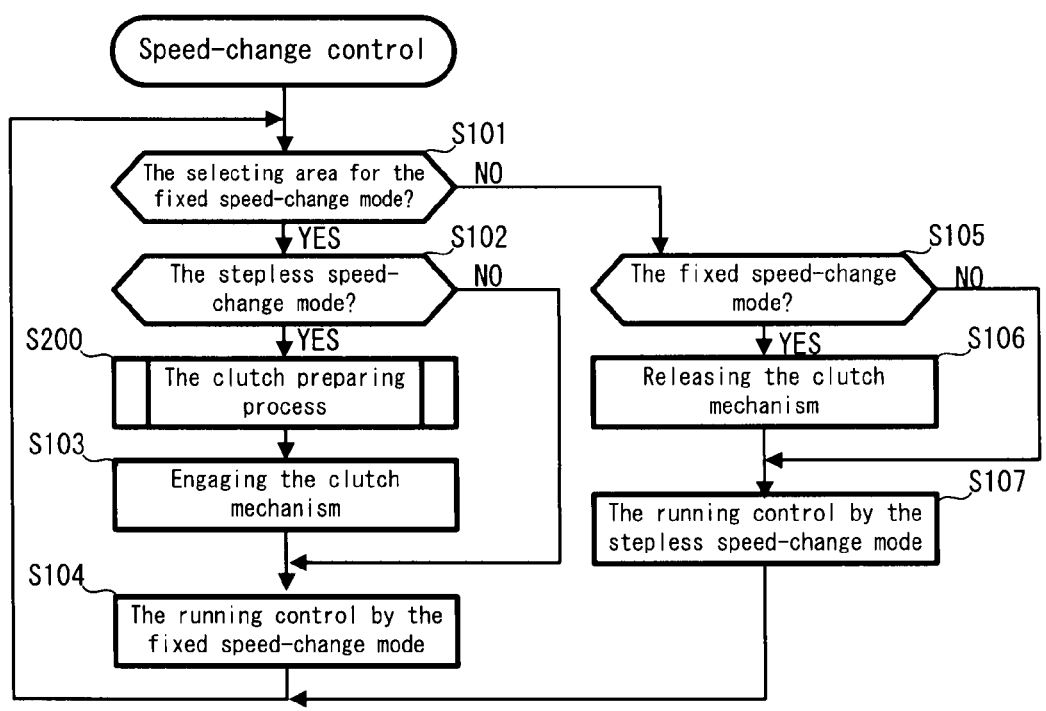

[FIG. 6]
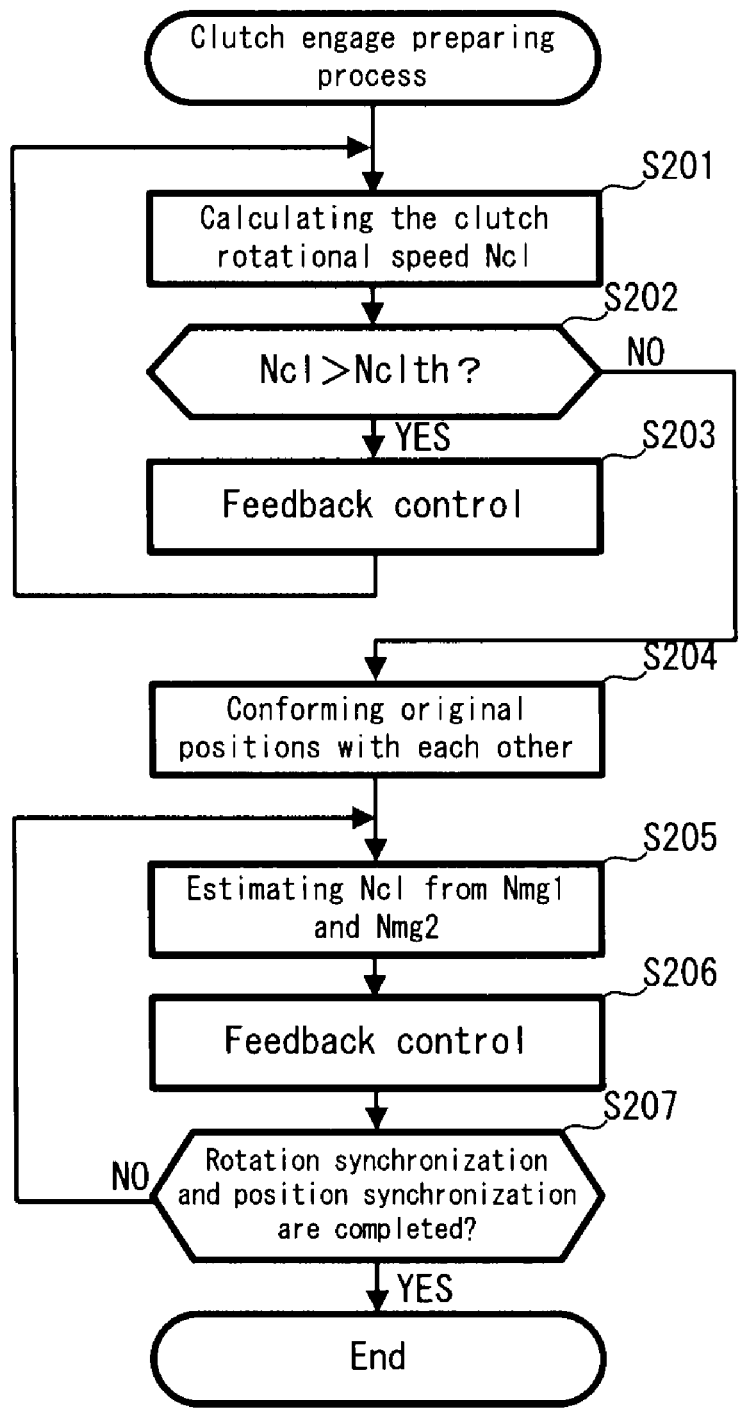

[FIG. 7]
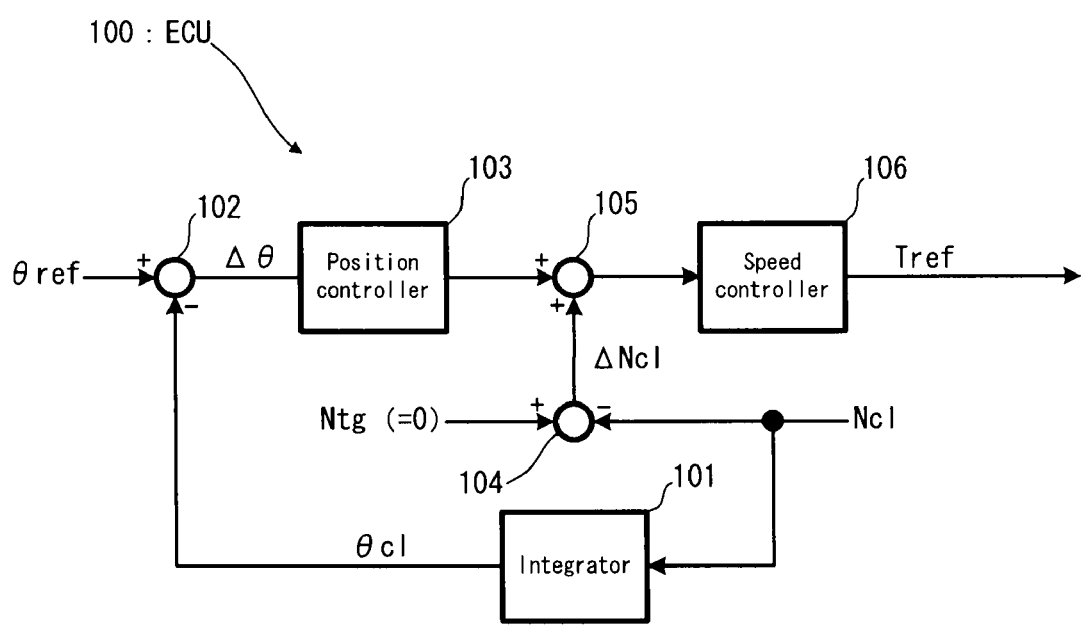

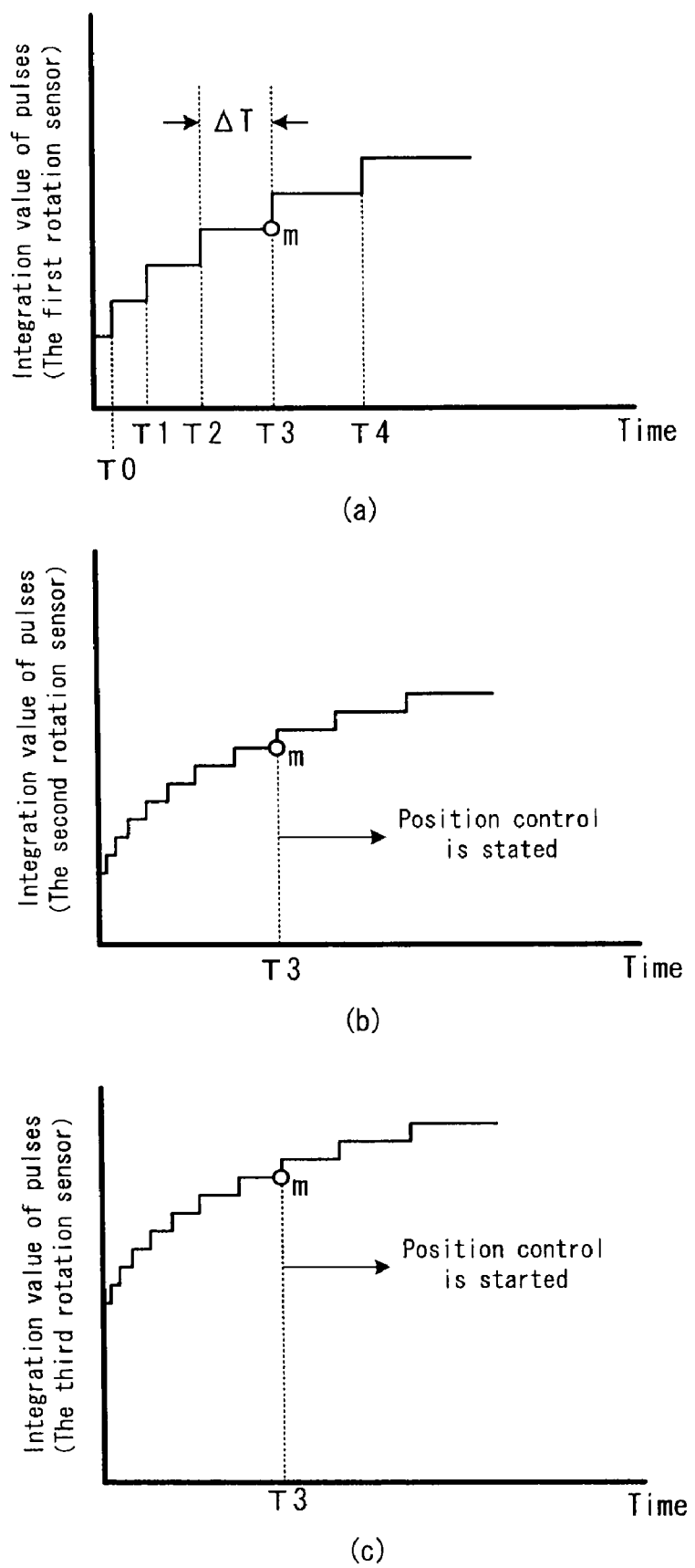
[FIG. 8]

CONTROL APPARATUS FOR HYBRID VEHICLE

BACKGROUND OF THE INVENTION

1. Field of the Invention

The present invention relates to a control apparatus for a hybrid vehicle, which is equipped with an internal combustion and an electric motor as the power source of a vehicle.

2. Description of Related Art

As this type of apparatus, there has been suggested an apparatus of performing rotation synchronization and position synchronization by feedback control on a dog clutch which can be applied to a hybrid vehicle (e.g. refer to Japanese Patent Application Publication Laying Open No. 2005-278225). According to the rotating-body control apparatus and method disclosed in Japanese Patent Application Publication Laying Open No. 2005-278225 (hereinafter referred to as a "conventional technology"), switching over from feedforward control to feedback control is performed on the basis of the judgment of whether or not it can be controlled in a target rotation status by a control model. Thus, the rotation status of a rotating body is considered to be easily controlled in the target rotation status on the basis of the control model.

Incidentally, there has been also suggested a technology in which motor control is performed on the basis of the variation of a duty value outputted by a feedback controlling device to an inverter in the low-speed rotation of a motor (e.g. refer to Japanese Patent Application Publication Laying Open No. Hei 9-308281).

Moreover, there has been also suggested such a technology that in a hybrid vehicle in which the number of revolutions of an engine is derived from the numbers of revolutions of a drive motor and a generator, if an abnormality of a generator resolver is detected, the number of revolutions of the engine is derived using a pulse from a crank shaft (e.g. refer to Japanese Patent Application Publication Laying Open No. 2001-171369).

Moreover, there has been also suggested such a technology of performing the feedback control by estimating the number of revolutions, instead of a number-of-revolutions-sensor (e.g. refer to Japanese Patent Application Publication Laying Open No. 2001-1779).

Moreover, there has been also suggested a transmission system of performing feedback by the number-of-revolutions-sensor (e.g. refer to Japanese Patent Application Publication Laying Open No. 2004-525326).

If a target rotational speed for a control target is in a relatively low area such as zero rotation, detection accuracy of the rotational speed of a rotating-body at the current time point, which is referred to in determining a feedback control amount associated with the feedback control near the target rotational speed, is possibly reduced. If the detection accuracy is reduced, even if the control model correctly functions, the rotation status of the rotating body possibly does not correctly move into the target rotation status. In particular, if the rotating body as the control target requires correct rotation control and position control such as a dog clutch, there may be troubles, for example, such as oscillation and noise in engaging dog teeth, in the situation lacking the control accuracy as described above. The occurrence of the troubles may actualize a reduction in drivability or reliability in the hybrid vehicle if these rotating bodies are mounted on the hybrid vehicle. In other words, the conventional technologies hardly avoid the reduction in drivability or reliability in the hybrid vehicle, due to the reduction in the detection accuracy of the rotational speed of the rotating body, which is technically problematic.

SUMMARY OF THE INVENTION

The present invention is a control apparatus for a hybrid vehicle which comprises an internal combustion, a first electric motor and a second motor connected to a driving shaft as a power source, and which comprises an engaging device comprising a first and a second engagement elements which can engage with each other under a rotation synchronization status, a first detecting device for being capable of detecting first rotational speed as rotational speed of the first engagement element, a power dividing device comprising a plurality of rotational elements being adapted to mutually perform differential rotation, which includes a first rotational element connected to an output shaft of the internal combustion, a second rotational element connected to an output shaft of the first electric motor, a third rotational element connected to an output shaft of the second electric motor, and a fourth rotational element connected to the first engagement element, and a second detecting device for being capable of detecting second rotational speed as rotational speed corresponding to other rotational elements of the plurality of rotational elements except the fourth rotational element, said hybrid vehicle being performed feedback control in order to converge the first rotational speed at target rotational speed corresponding to the rotation synchronization status in engaging the first engagement element with the second engagement element, said control apparatus comprising: a judging device for judging whether or not the detected first rotational speed is within a predetermined low rotational range; a estimating device for estimating the first rotational speed on the basis of the detected second rotational speed if it is judged that the detected first rotational speed is within the predetermined low rotational range; and a switching control device for switching the first rotational speed, which is referred to in determining a feedback control amount in the feedback control, from the detected first rotational speed to the estimated first rotational speed if it is judged that the detected first rotational speed is within the predetermined low rotational range.

The hybrid vehicle of the present invention comprises the internal combustion such as an engine which can use various fuels such as gasoline, light oil, or alcohol, the first electric motor such as a motor or a motor generator, and the second electric motor such as a motor or a motor generator, as a power source. The second motor is connected to the driving shaft which can conceptually adopt the following form as a preferred form: an axle, which can adopt a form such as a drive shaft or an axle shaft, directly or in directly connected to drive wheels; or various rotational shafts which are connected to the axle directly or the axle arbitrarily through such as various deceleration devices or transmission, or which are connected to the axle selectively or attributively through various devices (e.g. clutch) being capable of selective controlling a connection status.

In the hybrid vehicle of the present invention, the distribution of power among the plurality of power sources is determined in accordance with the structure, e.g. the physical, mechanical, mechanistic or electrical structure of the power dividing device. Here, the power dividing device is provided with the first to fourth rotational elements, which are adapted to perform at least mutually differential rotation; and the power dividing device can adopt a form of a complex planetary gear assembly or the like, as a preferred form. The "complex planetary gear assembly" described here includes a plurality of planetary gear assemblies, each of which is provided with a sun gear, a planetary carrier and an outer gear, as the rotational elements, and it is the concept including such a planetary gear assembly (i.e. complex planetary gear assembly) in which arbitrary elements or one part of rotational elements in each planetary gear assembly are directly or indirectly connected to make an integral rotational element (or rotational element which can be treated as one body).

The hybrid vehicle of the present invention is provided with the engaging device, which can conceptually adopt the following form: an engaging type clutch, such as a dog clutch; a hydraulically-controlled engaging apparatus, including various hydraulic clutches or a hydraulic brake; an electromagnetically-controlled friction engaging apparatus, such as an electromagnetic clutch; or a mechanical friction engaging apparatus, such as a band brake. The engaging device is provided with at least the first and second engagement elements which can engage with each other. Moreover, the engaging device can include various driving apparatus which can drive at least on of these engagement elements so that the engagement elements engage with each other, various detecting devices for detecting the physical states of the engagement elements, and the like, as occasion demands.

Even the physical, mechanical or electrical structure of the engaging device is anything (in other words, it is an indispensable condition for engaging or a mere prescribed condition for control), the first and second engagement elements are adapted to be engagable with each other under the rotation synchronization status (here, "engagable" means the first and second engagement elements can physically engage with each other, and also means permit of the engagement). Here, the "rotation synchronization status" includes the status in which the rotational speed of the first engagement element is equal to the rotational speed of the second engagement element as a preferred form. Moreover, the "rotation synchronization status" is the concept including the status in which the both rotational speeds are close enough to be equal in practice.

Here, in the hybrid vehicle of the present invention, a feedback control for converging first rotational speed as rotational speed of the first engagement element at target rotational speed corresponding to the rotational synchronization status is performed (incidentally, a feed-forward control may be performed in tandem with the feedback control) regardless of behavior occurred by engaging the first with second engagement elements (as will become apparent below, changing of a speed-change mode of the hybrid vehicle may be performed as a preferred form). Here, the target rotational speed simply indicates rotational speed of the second engagement element in view of the aforementioned definition of the rotational synchronization status. If the second rotational element is fixed such as physically, mechanically, electrically or magnetically, the target rotational speed may be zero. This type of feedback control may be such as the PID control, which arbitrarily includes P-term (proportional), I-term (integral term) and D-term (derivative term), as a preferred form. Alternatively, this type of feedback control may be other control. However, current rotational speed of the first engagement element is required as a reference value in varying degrees because of a feedback control.

On the other hand, the rotational speed of the first engagement element as the reference value is basically detected by the first detecting device such as a rotary encoder or a resolver. Detection accuracy of rotational speed within a low rotational range, especially in the rotational speed is vicinity zero, is prone to reduce as compared with that within other range regardless of a form of the first detecting device. Therefore, a suitable setting for the feedback control amount (e.g. P-term, I-term, D-term and the like) in the feedback control is relatively difficult if the target rotational speed for the first engagement element is zero, as such an extremely low rotational range or the like. Thus, it will be relatively difficult that the rotational speed of the first rotational element is rapidly and accurately converged at the target rotational speed. A trouble such as fluctuation or noise will be occurred by such as physically impact due to engaging engagement elements with each other under a condition in which convergent accuracy is low if the engaging device is such as a dog clutch, which needs physically rotation synchronization between engagement elements to engage engagement elements with each other. As a result, drivability or reliability (or durability) will be reduced.

According to the control apparatus for the hybrid vehicle of the present invention, in its operation, the judging device judges whether or not first rotational speed detected by the first detecting device is within a predetermined low rotational range. The judging device can adopt various processing units such as an ECU (Electronic Control Unit), various computer systems such as various controllers or a microcomputer apparatus, or the like. Here, the "predetermined low rotational range" includes a range being less than an appropriate criterion value as a preferred form. Moreover, the "predetermined low rotational range" is the concept including the following rotational range: a rotational range judged for a practically considerable trouble to be occurred on the basis of such as experiments, experiences, theory or simulation in performing the aforementioned feedback control; a rotational range can change in accordance with the physically, mechanically, electrically or magnetically structure of the first detecting device, or in accordance with a driving condition of the hybrid vehicle or an environment condition. An aspect for judging of the judging device may be variable in accordance with an established aspect in the low rotational range. The judging device, for example, may judge as follows: comparing between the detected first rotational speed and a criterion value stored in an appropriate memory device; or various calculating in accordance with an appropriate algorithm, arithmetic expression or logical expression in each case.

On the other hand, in the power dividing device, the first rotational element is connected to the internal combustion; the second rotational element is connected to the output shaft of the first electric motor; and the third rotational element is connected to the output shaft of the second electric motor. In view of these rotational elements being adapted to mutually perform differential rotation and rotational speed of the second electric motor being proportional to the vehicle speed, the first (or the second) rotational element has such a behavior that rotational speed of the first (or the second) rotational element is unambiguously determined in accordance with gear ratio between rotational elements if the rotational speed of the second (or the first) rotational element is determined. The fourth rotational element connected to the first engagement element has a similar behavior. Rotational speed of the fourth rotational element (the rotational speed is at least equal to the first rotational speed in practice) is also related to rotational speed of other rotational elements except the fourth rotational element. On the other hand, the hybrid vehicle of the present invention is provided with the second detecting device such as a rotary encoder or a resolver detecting second rotational speed as the rotational speed of the other rotational elements. As a preferred form, at least the first and second electric motors are provided with the second detecting device as an essential element for controlling its rotational speed, respectively.

Focusing attention on this point, in the control apparatus for the hybrid vehicle of the present invention, the estimating device estimates the first rotational speed on the basis of the detected second rotational speed (as a preferred form, it may involve a calculating process using such as gear ratio between rotational elements, which is preliminarily stored a appropriate memory device as a known value) if it is judged that the first rotational speed is within the low rotational range. The estimating device is various processing unit such as an ECU, various computer systems such as various controllers or a microcomputer apparatus, or the like. On this occasion, there is a high possibility that the second rotational speed(s) (e.g. rotational speed of the second rotational element corresponding to the first electric motor, and rotational speed of the third rotational element corresponding to the second electric motor) is higher than the rotational speed of the fourth rotational element (if the rotational speed of the fourth rotational element is zero, the possibility is higher) if the rotational speed (i.e. the first rotational speed in effect) of the fourth rotational element as one rotational element of the power dividing device is within the aforementioned low rotational range. Moreover, in view of the first rotational speed is preferably estimated on the basis of rotational speeds of a plurality of rotational elements of the other rotational elements, the estimated first rotational speed has reliability which is higher than at least reliability of the detected first rotational speed even if the second detecting device has such a characteristic feature that detection accuracy of the second detecting device reduces within the low rotational range as well as the first detecting device.

Here, according to the control apparatus for the hybrid vehicle of the present invention, in its operation, the switching control device switches the first rotational speed, which is referred (hereinafter referred to as a "reference value", as occasion demands) in determining the feedback control amount in the aforementioned feedback control, from the detected first rotational speed to the estimated first rotational speed if it is judged that the detected first rotational speed is within the low rotational range. The switching control device is various processing unit such as an ECU, various computer systems such as various controllers or a microcomputer apparatus, or the like. On this occasion, the switching control device controls an executing device for the feedback control to use the estimated first rotational speed switched from the detected first rotational speed. The switching control device may be a device which is differ from the executing device (it may be hardware or software) or may be a part of the executing device as at least a hardware construction.

As mentioned above, according to the control apparatus for the hybrid vehicle of the present invention, it is possible that the first rotational speed is accurately estimated on the basis of the second rotational speed, which correlates with the first rotational speed due to the structure of the power dividing device, even if it is concerned that the detection accuracy of the first detecting device, which detects the first rotational speed, reduces. Thus, the feedback control amount in the feedback control can be consistently and adequately determined regardless of the target rotational speed for the first engagement element and rotational range of the first rotational speed. It is possible that the reduction in convergent performance in the feedback control is restrained in requesting to engage the first and second engagement elements, or the like. It is possible to transfer the first and second engagement elements to the rotation synchronization status, rapidly and accurately. As a result, it is possible that the reduction in drivability or reliability in the hybrid vehicle is restrained.

In one aspect of the control apparatus for the hybrid vehicle of the present invention, said judging device judges the detected first rotational speed is within the predetermined low rotational range if the detected first rotational speed is less than a predetermined criterion value.

According to this aspect, load of the judging device is reduced because whether or not the first engagement element is within the low rotational range is judged by comparing the criterion value and the first rotational speed. The criterion value is a fixed value or a changeable value, which is preliminarily determined on the basis of experiments, experiences, theory, simulation or the like as a value to which detection accuracy of the rotational speed of the first engagement element is practically deteriorated to a considerable degree if the first rotational speed is less than the value. Incidentally, "less than" is concept which can be easily replaced with "less than or equal" in accordance with configuration of the criterion value. It is design that whether or not the criterion value is included within the low rotational range. Thus, it does not influence the essence of the present invention.

In another aspect of the control apparatus for the hybrid vehicle of the present invention, the first and second engagement elements are adapted to be capable of engaging each other under a position synchronization status, a position control for the first engagement element is performed in the feedback control on the basis of the referred first rotational speed to restore the first and second engagement elements to the position synchronization status, and said switching control device configures an original position which defines standard for the position control for said second detecting device to start the position control, which refers the estimated first rotational speed, in synchronization with a switching time point in switching the referred first rotational speed to the estimated first rotational speed.

The "position synchronization status" of the present invention is the concept including the following status: a status in which the first and second engagement elements stand still in a position relation for permitting the first and second engagement elements to engage with each other (in this case, "position" may be replaced with "phase" (or "angle") in view of at least the first engagement element being a rotating body); and a status which can be treated as well as the aforementioned status. Therefore, the position synchronization status of the present invention is a status which involves the rotation synchronization status (i.e. if a status is not the rotation synchronization status, the status is not the position synchronization), and which is one status of the rotation synchronization status.

Here, it is possible that the position (or phase or angle) of the first engagement element is specified by integrating, regularly or irregularly, a time integration value of the rotational speed of the first engagement element as a preferred form. Constantly, the position control for the first engagement element can be performed if the detected first rotational speed or the estimated first rotational speed is used as the aforementioned reference value. On the other hand, in a transient period when the reference value is switched, reliability in the position control after the switch (i.e. the position control which uses the estimated first rotational speed) distinctively reduces if position information of the first engagement element is not shared before and after the switch.

According to this aspect, the original position which defines standard for the position control for the second detecting device is configured (if the second detecting device comprises a plurality of detecting devices, original positions for the plurality of detecting devices are matched) to start the position control, which refers the estimated first rotational speed in synchronization with switching the reference value to the estimated first rotational speed. Consequently, the position control for the first engagement element is continuously performed without substantially any change before and after switching the reference value. Thus, it is possible that the position control is performed accurately.

In another aspect of the control apparatus for the hybrid vehicle of the present invention, said hybrid vehicle adopts a stepless speed-change mode which can continuously change a rotational speed ratio between the output shaft of the internal combustion and the driving shaft as a speed-change mode by that the second rotational element has reaction torque of output torque of the internal combustion if said engaging device is in a release state in which the first engagement element is released from the second engagement element, and adopts a fixed speed-change mode which fixes the rotational speed ratio to a predetermined value as the speed-change mode by that rotation of the first engagement element is blocked and that the fourth rotational element has the reaction torque if said engaging device is in an engagement state in which the first engagement element engages with the second engagement element.

According to this aspect, if the engaging device adopts the release state, which is defined as the state that the first engagement element is released from the second engagement element (i.e. the state that the engagement elements are discrete from each other and that the rotation of the first engagement element is not influenced by at least the second engagement element), the hybrid vehicle adopts the stepless speed-change mode as the speed-change mode. In the stepless speed-change mode, the second rotational element (i.e. uniquely regarded as the first electric motor) is the reaction element and receives the reaction torque of the output torque of the internal combustion, thereby it is possible that the rotational speed ratio (i.e. speed-change ratio) between the output shaft of the internal combustion such as a crankshaft and the driving shaft, strictly, substantially, or continuously within a range defined physically, mechanically, mechanistically or electrically in advance (including a stepwise aspect similar to being continuous in practice).

At this time, by a rotational speed control for the first electric motor, which has a function as a rotational speed control mechanism being capable of controlling the rotational speed of the first rotational element connected to the output shaft of the internal combustion and the rotational speed of the fourth rotational element connected to the first engagement element, for example, the operating point of the internal combustion (one operation condition defined by the output torque and the combustion rotational speed (i.e. the rotational speed of the output shaft)) is arbitrarily selected, theoretically, substantially, or within some restriction, and an operating point for the internal combustion is controlled to an optimum fuel consumption operating point or the like at which a fuel consumption rate can be realistically minimal (maximal in terms of travel distance per unit fuel amount), theoretically, substantially, or within some restriction.

On the other hand, the second engagement element is in a state in which the second engagement element is fixed, for example, physically, mechanically, mechanistically or electrically, or directly or indirectly as a preferred form. Alternatively, unlike these, the second engagement element is composed to be capable of holding, gripping or sandwiching the first engagement element. The second engagement element, which is composed of single element or plurality elements, can stop the rotation of the first rotational element in the state in which the second rotational element engages with at least the first engagement element. Therefore, if the engaging device adopts the engagement state in which the first and second engagement elements engage with each other, rotation of the first engagement element (uniquely regarded as the fourth rotational element of the power dividing device) is stopped by the second engagement element.

In this case, the aforementioned speed-change ratio is fixed to one value in which a so-called overdrive speed-change ratio can be adopted as a preferred aspect (or fixed speed-change ratio) at which combustion rotational speed is less than rotational speed of the driving shaft. Thus the fixed speed-change mode is realized. At this time, the rotational speeds of the single or plurality of first rotational elements, which are directly or indirectly connected to the output shaft of the internal combustion capable of functioning as the input member of the power dividing device, are uniquely defined by the fourth rotational element whose rotational speed is zero or can be regarded as zero, physically or substantially, and by the rotational speed of the third rotational element, which is directly or indirectly connected to the axle shaft and which rotates in balance with a road load, as a preferred form. If the fixed speed-change mode is selected and run as the speed-change mode, the fourth rotational element of the power dividing device functions as a reaction element bearing the reaction torque of the output torque of the internal combustion, and does not need supply of driving power corresponding to the reaction torque from the first electric motor because rotation of the fourth rotational element is stopped by a physical, mechanical, mechanistic, electrical, or magnetic force generated by the engaging device. Consequently, the use efficiency of energy source (preferably electric power) in the overall hybrid vehicle is improved. In this way, if it is possible to switch the speed-change mode by behavior of the engaging device, the practical utility which is obtained by the present invention grows because the necessity making engagement elements be in the rotation synchronization status or in the rotation synchronization status and the position synchronization status increases.

Incidentally, the speed-change condition which defines whether or not this type of speed-change mode is switched (i.e. the advisability of the performance) may be preliminarily determined as the following condition in accordance with such as vehicle speed or load conditions: a condition in which the fixed speed-change mode is within a rotational range in which the combustion rotational speed of the internal combustion is higher than self-sustaining rotational speed, target rotational speed obtained by adding on constant or random margin to the self-sustaining rotational speed, or stable rotational speed on the basis of experiments, experiences, theory, simulations or the like; a condition in which the fixed speed-change mode is within a rotational range which has the rotational speed being higher than the self-sustaining rotational speed, which is defined in accordance with the physical, mechanical, mechanistic or electrical structure of the internal combustion, target rotational speed obtained by adding on constant or random margin to the self-sustaining rotational speed, or stable rotational speed. The fixed speed-change mode may be selected in a so-called high-speed light-load area, which is defined on the basis of the vehicle speed, the required load of the internal combustion or the like (a judgment criteria of whether or not to be high-speed and whether or not to be light-load can be determined, as occasion demands, in accordance with the specification, treatment, required performance of the vehicle or the internal combustion, or the physical, mechanical, mechanistic, or electrical structure or the like of the power dividing device). Incidentally, if the fixed speed-change mode is selected in the high-speed light-load area as described above, the fixed speed-change ratio is preferably the overdrive speed-change ratio.

The nature, utility, and further features of this invention will be more clearly apparent from the following detailed description with reference to preferred embodiment of the invention when read in conjunction with the accompanying drawings briefly described below.

BRIEF DESCRIPTION OF THE DRAWINGS

FIG. 1 is a schematic configuration diagram conceptually showing the structure of a hybrid vehicle in a first embodiment of the present invention;

FIG. 2 is a schematic diagram showing an engine in the hybrid vehicle in FIG. 1;

FIG. 3 is a schematic configuration diagram conceptually showing the structure of a power dividing mechanism in the hybrid vehicle in FIG. 1;

FIG. 4 is a nomogram corresponding to each speed-change mode realized in the power dividing mechanism in FIG. 3;

FIG. 5 is a flowchart showing speed-change control performed by an ECU in the hybrid vehicle in FIG. 1;

FIG. 6 is a flowchart showing an engagement preparation process selectively performed in a process of performing the speed-change control in FIG. 5;

FIG. 7 is a schematic block diagram associated with feedback control selectively performed in the process of performing the speed-change control in FIG. 5; and FIG. 8 is a schematic diagram explaining an operation status of each rotation sensor in the hybrid vehicle in FIG. 1.

DETAILED DESCRIPTION OF THE PREFERRED EMBODIMENTS

Hereinafter, a preferred embodiment of the present invention will be explained with reference to the drawings.

Structure of Embodiment

Firstly, with reference to FIG. 1, an explanation will be given on the structure of a hybrid vehicle 10 in an embodiment of the present invention. FIG. 1 is a schematic configuration diagram conceptually showing the structure of the hybrid vehicle 10.

In FIG. 1, the hybrid vehicle 10 is provided with an ECU 100; an engine 200; a power dividing mechanism 300; a motor generator MG1 (hereinafter abbreviated to a "MG1", as occasion demands); a motor generator MG2 (hereinafter abbreviated to a "MG2", as occasion demands); a PCU (Power Control Unit) 400; a battery 500; a first rotation sensor 600; a second rotation sensor 700; and a third rotation sensor 800. The hybrid vehicle 10 is one example of the "hybrid vehicle" of the present invention.

The ECU 100 is provided with a CPU (Central Processing unit), a ROM (Read Only Memory), a RAM, and the like. The ECU 100 is an electronic control unit, adapted to control the entire operation of the hybrid vehicle 10, and it is one example of the "control apparatus for the hybrid vehicle" of the present invention. The ECU 100 can perform speed-change control described later, in accordance with a control program stored in the ROM.

Incidentally, the ECU 100 is an integrated or one-body electronic control unit, adapted to function as one example of the "judging device", "estimating device", and the "switching control device" of the present invention. The respective operations of the devices are all performed by the ECU 100; however, the physical, mechanical, and electrical configurations of each of the devices are not limited to this. For example, the devices may be constructed as various computer systems such as microcomputer apparatuses, various controllers, various processing units, and a plurality of ECUs.

The engine 200 is a gasoline engine as one example of the "internal combustion" of the present invention, and it can function as the main power source of the hybrid vehicle 10. Now, with reference to FIG. 2, the detailed structure of the engine 200 will be explained. FIG. 2 is a schematic diagram showing the engine 200. Incidentally, in FIG. 2, the repeated points of FIG. 1 carry the same reference numerals, and the explanation thereof will be omitted as occasion demands. Incidentally, the "internal combustion" of the present invention includes a two-cycle or four-cycle reciprocating engine or the like and has at least one cylinder. The "internal combustion" of the present invention conceptually includes a mechanism adapted to extract an explosive power, generated when an air-fuel mixture including various fuels, such as gasoline, light oil, or alcohol, combusts in a combustion chamber in the cylinder, as a driving force through a power transmitting device such as a piston, a connecting rod, and a crankshaft, as occasion demands. As long as such a concept is satisfied, the configuration of the internal combustion in the present invention is not limited to that of the engine 200, but may have various aspects.

In FIG. 2, the engine 200 enables the air-fuel mixture to be combusted through an ignition operation by an ignition apparatus 202 in which one portion of an ignition plug (whose reference numerical is omitted) is exposed in the combustion chamber in the cylinder 201. The engine 200 can also convert the reciprocating motion of a piston 203, caused in accordance with the explosive power by the combustion, to the rotational motion of a crankshaft 205 (i.e. one example of the "output shaft of the internal combustion" of the present invention) through a connecting rod 204.

In the vicinity of the crankshaft 205, a crank position sensor 206 is placed, which detects the rotational position of the crankshaft 205 (i.e. a crank angle). The crank position sensor 206 is electrically connected to the ECU 100 (not illustrated), and the ECU 100 can calculate the combustion rotational speed NE of the engine 200 on the basis of a crank angle signal outputted from the crank position sensor 206.

In the engine 200, the air sucked from the exterior (or intake air) is supplied through an intake tube 207 and an intake port 210 to the inside of the cylinder 201 in the opening of an intake valve 211. On the other hand, the fuel injection valve of an injector 212 is exposed in the intake port 210, and it is adapted to inject the fuel to the intake port 210. The fuel injected from the injector 212 is mixed with the intake air before or after the opening timing of the intake valve 211, to thereby make the aforementioned air-fuel mixture.

The fuel is stored in a not-illustrated fuel tank and is supplied to the injector 212 through a not-illustrated delivery pipe by the operation of a not-illustrated feed pump. The air-fuel mixture combusted in the cylinder 201 becomes an exhaust gas and is supplied to an exhaust tube 215 through an exhaust port 214 in the opening of an exhaust valve 213 which opens or closes in conjunction with the opening or closing of the intake valve 211.

On the other hand, on the upstream side of the intake port 210 in the intake tube 207, a throttle valve 208 is disposed, which adjusts an intake air amount associated with the intake air supplied through a not-illustrated cleaner. The throttle valve 208 is constructed such that the driving state thereof is controlled by a throttle valve motor 209, which is electrically connected to the ECU 100. Incidentally, the ECU 100 basically controls the throttle valve motor 209 to obtain a throttle opening degree according to the opening degree of an accelerator pedal not illustrated (hereinafter referred to as an "accelerator opening degree", as occasion demands); however, it can also adjust the throttle opening degree without a driver's will through the operation control of the throttle valve motor 209. In other words, the throttle valve 208 is constructed as a kind of electronically-controlled throttle valve.

In the exhaust tube 215, a ternary catalyst 216 is placed. The ternary catalyst 216 is a catalyst apparatus adapted to purify each of CO (carbon monoxide), HC (hydrocarbon), and NOx (nitrogen oxide), emitted from the engine 200. Incidentally, in the engine 200, various catalysts such as a NSR catalyst (or NOx storage-reduction catalyst) or an oxidation catalyst may be placed, instead of or in addition to the ternary catalyst 216.

Moreover, in the exhaust tube 215, an air-fuel ratio sensor 217 is placed, which can detect the exhaust air-fuel ratio of the engine 200. Moreover, in a water jacket placed in a cylinder block for accommodating the cylinder 201, a water temperature sensor 218 is disposed in order to detect a coolant temperature associated with a coolant (LLC) circulated and supplied to cool the engine 200. The air-fuel ratio sensor 217 and the temperature sensor 218 are electrically connected to the ECU 100, and the detected air-fuel ratio and the detected coolant temperature are grasped by the ECU 100 at a constant or inconstant frequency.

Back in FIG. 1, the motor generator MG1 is an electric motor generator as one example of the "first electric motor" of the present invention, adapted to mainly generate electricity for charging a battery 500 or for supplying electricity to the motor generator MG2 by being driven by torque from the engine 200 and being rotated. The motor generator MG1 can continuously change the combustion rotational speed NE of the engine 200 through the control of the rotational speed thereof. Such a stepless speed change function is due to the differential operation of the power dividing mechanism 300 described later. Incidentally, the motor generator MG1 can also function as an electric motor, depending on the travel state of the hybrid vehicle 10.

The motor generator MG2 is an electric motor generator as one example of the "second electric motor" of the present invention, adapted to function as an electric motor for assisting the power of the engine 200 or as an electric generator for charging the battery 500. More specifically, the motor generator MG2 is an apparatus for aiding (or assisting) a driving force or a braking force. If assisting the driving force, the motor generator MG2 is supplied with electricity and functions as the electric motor. If assisting the braking force, the motor generator MG2 is rotated by torque transmitted from the driving wheel side of the hybrid vehicle 10 and functions as the electric generator for generating electricity.

Incidentally, each of the motor generator MG1 and the motor generator MG2 is constructed as, for example, a synchronous electric motor generator, and it is provided with a rotor having a plurality of permanent magnets on the outer circumferential surface; and a stator having a three-phase coil for forming a rotating magnetic field; however, it may be another form of motor generator. The motor generator MG2 has such a structure that the output rotational shaft thereof is connected to a driving shaft 320 described later (i.e. one example of the "driving shaft" of the present invention) to allow the driving shaft 320 to be supplied with the power, wherein the driving shaft 320 is connected through a deceleration mechanism 11 including various reduction gear apparatuses, such as a differential, to drive shafts SFL and SFR, which are connected to a left front wheel FL and a right front wheel FR as the driving wheels of the hybrid vehicle 10, respectively. In other words, the rotational speed of the driving shaft 320 is uniquely or unambiguously related to the rotational speed Nmg2 of the motor generator MG2.

The PCU 400 includes an inverter or the like, which is adapted to convert a direct-current (DC) power extracted from the battery 500 to an alternating-current (AC) power and to supply it to the motor generators MG1 and MG2, and which is adapted to convert an AC power generated by the motor generators MG1 and MG2 to a DC power and to supply it to the battery 500. The PCU 400 is a control unit adapted to individually control the input/output of the power between the battery 500 and each motor generator. The PCU 400 is electrically connected to the ECU 100, and the PCU 400 is controlled by the ECU 100.

The battery 500 is a chargeable accumulator or storage battery, adapted to function as a power supply source associated with the power for power-running the motor generators MG1 and MG2.

The power dividing mechanism 300 is a complex planetary gear unit, as one example of the "power dividing device" of the present invention, adapted to physically control the input/output state of the power between the driving shaft 320 and each of the engine 200 and the motor generators MG1 and MG2. Now, with reference to FIG. 3, the detailed structure of the power dividing mechanism 300 will be explained. FIG. 3 is a schematic configuration diagram conceptually showing the structure of the power dividing mechanism 300. Incidentally, in FIG. 3 the repeated points of FIG. 1 carry the same reference numerals, and the explanation thereof will be omitted as occasion demands.

In FIG. 3, the power dividing mechanism 300 can divide the output torque of the engine 200 (hereinafter referred to as "engine torque", as occasion demands) into the motor generator MG1 and the driving shaft 320, and it is provided with a plurality of rotational elements which mutually cause the differential operation. More specifically, the power dividing mechanism 300 is provided with a plurality of pairs of differential mechanisms. An input shaft 310 is connected to the first rotational element of the three rotational elements which mutually cause the differential operation. The rotational shaft of the motor generator MG1 is connected to the second rotational element. The driving shaft 320 is connected to the third rotational element. The input shaft 310 is connected to the crankshaft 205 of the engine 200 described above, and the driving shaft 320 is connected to the rotational shaft of the motor generator MG2, as described above, and to a MG2 speed-changing part 360 described later. In other words, each of the engine 200 and the motor generators MG1 and MG2 is connected to the power dividing mechanism 300.

The power dividing mechanism 300 is formed as a so-called Ravigneaux planetary gear mechanism, provided with a first planetary gear mechanism 330 of a single pinion gear type; and a second planetary gear mechanism 340 of a double pinion type, as the differential mechanism.

The first planetary gear mechanism 330 is provided with a sun gear 331; a carrier 332; a ring gear 333; and a pinion gear 334, which engages with the sun gear 331 and the ring gear 332 and which is held by the carrier 332 so as to rotate in an axial direction and to revolve because of the rotation of the carrier 332. The motor generator MG1 is connected to the sun gear 331. The input shaft 310 is connected to the carrier 332. The driving shaft 320 is connected to the ring gear 333.

The second planetary gear mechanism 340 is provided with a sun gear 341; a carrier 342; a ring gear 343; a pinion gear 344, which engages with the ring gear 343; and a pinion gear 345, which engages with the sun gear 331, wherein each of the pinion gears 344 and 345 is held by the carrier 342 so as to rotate in an axial direction and to revolve because of the rotation of the carrier 342. A clutch plate 351 of a clutch mechanism 350 described later is connected to the sun gear 341. The ring gear 333 of the first planetary gear mechanism 330 is connected to the carrier 342. The carrier 332 of the first planetary gear mechanism 330 is connected to the ring gear 343.

As described above, as a whole, the power dividing mechanism 300 is provided with the four rotational elements in total, which are the sun gear 331 of the first planetary gear mechanism 330; the sun gear 341 of the second planetary gear mechanism 340; the carrier 332 of the first planetary gear mechanism 330 and the ring gear 343 of the second planetary gear mechanism 340, which are mutually connected; and the ring gear 333 of the of the first planetary gear mechanism 330 and the carrier 342 of the second planetary gear mechanism 340, which are mutually connected. The sun gear 331 is one example of the "second rotational element" of the present invention. The sun gear 341 is one example of the "fourth rotational element" of the present invention. The carrier 332 and the ring gear 343 are one example of the "first rotational element" of the present invention. The ring gear 333 and the carrier 342 are one example of the "third rotational element" of the present invention.

The clutch mechanism 350 is a dog clutch mechanism as one example of the "engaging device" of the present invention. The clutch mechanism 350 is equipped with a clutch plate 351 and a clutch plate 352, which engage each other, thereby providing the engagement.

The clutch plate 351 is one example of the "first engagement element" of the present invention, wherein the clutch plate 351 is connected to the sun gear 341 of the second planetary gear mechanism 340, and the clutch plate 351 can rotate with the sun gear 341. On the engagement surface of the clutch plate 351 facing the clutch plate 352, a plurality of dog teeth are formed, which make a physical unevenness part. Moreover, the clutch plate 352 is one example of the "second engagement element" of the present invention, wherein the clutch plate 352 is physically fixed to the case part of the power dividing mechanism 300. On the engagement surface of the clutch plate 352 facing the clutch plate 351, a plurality of dog teeth are formed, which are the same as the dog teeth of the clutch plate 351 and which can mutually engage with the dog teeth of the clutch plate 351. In the engagement of the clutch mechanism 350, the dog teeth formed on the clutch plate 351 and the dog teeth formed on the clutch plate 352 engage with each other. At this time, since the clutch plate 351 is physically fixed, the rotation of the clutch plates 351 and the rotation of the sun gear 341 connected to the clutch plates 351 are stopped, and the clutch 351 and the sun gear 341 also get physically fixed.

The clutch mechanism 350 is provided with a driving apparatus for driving the clutch plate 351 (not illustrated), in addition to the illustrated clutch plates 351 and 352. The driving apparatus is a driving force applying device, adapted to apply a driving force for stroking the clutch plate 351 in a direction of the clutch plate 352. The driving apparatus is electrically connected to the ECU 100, and the operation of the driving apparatus is superior-controlled by the ECU 100.

Here, the clutch mechanism 350 is a dog clutch mechanism. The clutch mechanism 350 can form the engagement state without the power loss due to friction by engaging dog teeth, which are formed on each of clutch plates as an engagement element, with each other. On the other hand, in engaging clutch plates with each other, it is necessary as an authorization condition for the engagement that clutch plates are in the rotation synchronization status and the position synchronization status.

Here, the "rotational synchronization status" of this embodiment indicates a status in which clutch rotational speed Ncl corresponds with rotational speed of the clutch plate 352 within the region in which at least any practical problem is not caused. In this embodiment, the clutch plate 352, as an engagement target of the clutch plate 351, is a so-called brake fixed physically, so that the rotational speed thereof is zero. Therefore, the ECU 100 controls rotational speed of the motor generator MG1 such that the clutch rotational speed is zero by the feedback control as will become apparent below.

On the other hand, the "phase synchronization status" indicates a status in which the position (or angle) of the clutch plate 351 is settled at a predetermined engagable position at which the dog teeth formed on clutch plates can engage with each other (i.e. concave portions and convex portions can engage with each other) in shifting the clutch plate 351 to the clutch plate 352 by a drive assembly. At this time, since the clutch plate 352 is physically stopped, the phase synchronization status is substantially realized by the position control for the clutch plate 351 in the feedback control as will become apparent below. Incidentally, information on the engageable position is provided in advance for the ECU 100.

Incidentally, a structure that the "engaging device" of the present invention can adopt is not limited to the clutch mechanism 350, in so far as requiring at least the rotation synchronization (including the request as a matter of physical structure or the request as a matter of control) in engaging engagement elements with each other, but it may be another type of engaging device, or various friction engaging apparatuses driven in accordance with a hydraulic pressure or electromagnetic force, or various engaging apparatuses having another physical, mechanical, or electric engagement aspect.

The MG2 speed-changing part 360 is placed on a power transmission path between a rotational shaft of the motor generator MG2 and the driving shaft 320, and it is provided with a plurality of friction engaging apparatuses; and driving apparatuses, such as hydraulic actuators, for driving the respective friction engaging apparatuses. The MG2 speed-changing part 360 can change a rotational speed ratio between the rotational shaft of the motor generator MG2 and the driving shaft 320 in a stepwise manner, by the combination of contact states of the respective plurality of friction engaging apparatuses. The change gear ratio of the MG2 speed-changing part 360 is controlled accordingly by the ECU 100 through a control for the aforementioned driving apparatuses such that the motor generator MG2 does not exceed the maximum rotational speed and such that the motor generator MG2 rotates in as a highly efficient rotation area as possible.

Back in FIG. 1, the hybrid vehicle 10 is provided with a first rotation sensor 600, a second rotation sensor 700 and a third rotation sensor.

The first rotation sensor 600, which includes a detecting body rotating in synchronization with the clutch plate 351 of the power dividing mechanism 300, is a rotary encoder being capable of outputting a pulse signal with respect to each predetermined rotation phase of the detecting body. The first rotation sensor 600 is connected to the ECU 100, electrically. The outputted pulse signal is referred by the ECU 100, regularly or irregularly. Since the rotation phase, which defines the output interval of the pulse signal, is preliminarily determined as a fixed value, the ECU 100 can calculate the clutch rotational speed Ncl (i.e. one example of the "first rotational speed" of the present invention) as a rotational speed of the detecting body i.e. uniquely a rotational speed of the clutch plate 351 on the basis of an obtaining cycle of the pulse signal. Namely, the first rotation sensor 600 is one example of the "first detecting device" of the present invention, which can indirectly detect the clutch rotational speed Ncl on the basis of the outputted pulse signal. Incidentally, in this embodiment, the first rotation sensor 600 only outputs the pulse signal to the ECU 100. However, the first rotation sensor 600 may have the function eliciting the clutch rotational speed Ncl by time-processing the pulse single in addition to this type of outputting the pulse signal. In this case, the first rotation sensor 600 may send the electric signal corresponding to the clutch rotational speed Ncl to the ECU 100 in place of or in addition to the pulse signal.

The second rotation sensor 700, which includes a detecting body rotating in synchronization with the rotor of the motor generator MG1, is a rotary encoder being capable of outputting a pulse signal with respect to each predetermined rotation phase of the detecting body. The second rotation sensor 700 is connected to the ECU 100, electrically. The outputted pulse signal is referred by the ECU 100, regularly or irregularly. Since the rotation phase, which defines the output interval of the pulse signal, is preliminarily determined as a fixed value, the ECU 100 can calculate the MG1 rotational speed Nmg1 (i.e. one example of the "second rotational speed" of the present invention) as a rotational speed of the detecting body i.e. uniquely a rotational speed of the motor generator MG1 on the basis of an obtaining cycle of the pulse signal. Namely, the second rotation sensor 700 is one example of the "second detecting device" of the present invention, which can indirectly detect the MG1 rotational speed Nmg1 on the basis of the outputted pulse signal. Incidentally, in this embodiment, the second rotation sensor 700 only outputs the pulse signal to the ECU 100. However, the second rotation sensor 700 may have the function eliciting the MG1 rotational speed Nmg1 by time-processing the pulse signal in addition to this type of outputting the pulse signal. In this case, the second rotation sensor 700 may send the electric signal corresponding to the MG1 rotational speed Nmg1 to the ECU 100 in place of or in addition to the pulse signal.

The third rotation sensor 800, which includes a detecting body rotating in synchronization with the rotor of the motor generator MG2, is a rotary encoder being capable of outputting a pulse signal with respect to each predetermined rotation phase of the detecting body. The third rotation sensor 800 is connected to the ECU 100, electrically. The outputted pulse signal is referred by the ECU 100, regularly or irregularly. Since the rotation phase, which defines the output interval of the pulse signal, is preliminarily determined as a fixed value, the ECU 100 can calculate the MG2 rotational speed Nmg2 (i.e. other example of the "second rotational speed" of the present invention) as a rotational speed of the detecting body i.e. uniquely a rotational speed of the motor generator MG2 on the basis of an obtaining cycle of the pulse signal. Namely, the third rotation sensor 800 is other example of the "second detecting device" of the present invention, which can indirectly detect the MG2 rotational speed Nmg2 on the basis of the outputted pulse signal. Incidentally, in this embodiment, the third rotation sensor 800 only outputs the pulse signal to the ECU 100. However, the third rotation sensor 800 may have the function eliciting the MG2 rotational speed Nmg2 by time-processing the pulse signal in addition to this type of outputting the pulse signal. In this case, the third rotation sensor 800 may send the electric signal corresponding to the MG2 rotational speed Nmg2 to the ECU 100 in place of or in addition to the pulse signal.

Operation of Embodiment

<Details of Speed-Change Mode>

The power dividing mechanism 300 functions as a speed-changing apparatus of the hybrid vehicle 10. At this time, in the power dividing mechanism 300, the following two types of speed-change modes are selectively realized: a stepless speed-change mode and a fixed speed-change mode.

When the power dividing mechanism 300 drives the engine 200 in the condition that the corresponding rotational element (which is the sun gear 341 of the second planetary gear mechanism 340 in this case) is not fixed by the clutch mechanism 350, the engine torque is divided into and transmitted to the motor generator MG1 and the driving shaft 320, by the power dividing mechanism 300. This is due to the differential operation of the power dividing mechanism 300. By increasing or decreasing the MG1 rotational speed Nmg1, the combustion rotational speed NE of the engine 200 is controlled in a stepless (or continuous) manner. This is a stepless speed-change state, and the speed-change mode corresponding to the stepless speed-change state is the stepless speed-change mode. In the stepless speed-change mode, only the first planetary gear mechanism 330 substantially contributes to the transmission of the engine torque to the driving shaft 320. The combustion rotational speed NE of the engine 200 in the stepless speed-change mode is controlled, with a value corresponding to an optimum fuel consumption operating point being set as a target rotational speed, such that the operating point of the engine 200 (an operational condition defined as a combination of the combustion rotational speed and a load (i.e. uniquely regarded as the engine torque)) is the optimum fuel consumption operating point at which the fuel consumption of the engine 200 is minimal.

In contrast, if the sun gear 341 as one rotational element of the power dividing mechanism 300 is physically fixed by the clutch mechanism 350, the speed-change ratio of the power dividing mechanism 300 (i.e. a ratio of the combustion rotational speed NE of the engine 200 and the rotational speed Nout of the driving shaft 320 (hereinafter referred to as an "output rotational speed Nout", as occasion demands)) is fixed to one speed-change ratio, so that the fixed speed-change ratio is realized. More specifically, in the planetary gear mechanism, if the rotational speeds of two of the three elements, which are the sun gear, the carrier, and the ring gear, are determined, a rotational speed of the remaining one element is inevitably determined. In the second planetary gear mechanism 340, an output rotational speed Nout having a one-to-one relationship with a rotational speed of the carrier 342 is uniquely determined from the vehicle speed of the hybrid vehicle 10, and if the sun gear 341 is fixed and a rotational speed becomes zero, then a rotational speed of the ring gear 343 as one remaining element is inevitably determined. The ring gear 343 is connected to the carrier 332 of the first planetary gear mechanism 330 as described above, and the carrier 332 is connected to the input shaft 320, which is connected to the crankshaft 205 of the engine 200. Therefore, the combustion rotational speed NE of the engine 200 also inevitably has a one-to-one relationship with the rotational speed of the ring gear 343. In other words, in the fixed speed-change mode, the change characteristics of the combustion rotational speed NE of the engine 200 is uniquely determined in accordance with the vehicle speed V.

As described above, in the condition that the sun gear 341 is fixed by the clutch mechanism 350, a reaction element having the reaction torque of the engine torque in the power dividing mechanism 300 can be transferred from the sun gear 331 (i.e. uniquely regarded as the motor generator MG1) to the sun gear 341 (i.e. uniquely regarded as the clutch mechanism 350). When the reaction element is transferred as described above, only the second planetary gear mechanism 340 substantially contributes to the transmission of the engine torque to the driving shaft 320. Therefore, it is unnecessary to make the motor generator MG1 function as the electric generator and the electric motor, and there is no need to generate electricity on the motor generator MG2 and to feed it to the motor generator MG1, or to feed electricity from the battery 500 to the motor generator MG1. In other words, there is no electricity consumption; namely, in the fixed speed-change mode, there is no power loss caused by repeating the energy conversion between mechanical energy and electrical energy, i.e. power circulation, so that it is possible to prevent or limit or control poor fuel efficiency.

Now, with reference to FIG. 4, the stepless speed-change mode and the fixed speed-change mode will be further explained. FIG. 4 is a nomogram of the power dividing mechanism 300 corresponding to each speed-change mode. Incidentally, in. FIG. 4, the repeated points of FIG. 1 carry the same reference numerals, and the explanation thereof will be omitted as occasion demands.

In FIG. 4, from the left, the MG1 (i.e. uniquely regarded as the sun gear 331), the clutch mechanism 350 (i.e. uniquely regarded as the sun gear 341), the engine 200 (i.e. uniquely regarded as the carrier 332 and the ring gear 343), and the driving shaft 320 (i.e. uniquely regarded as the carrier 333 and the carrier 342) are shown in this order, and the rotational speeds thereof are shown on the vertical axis. Incidentally, it is assumed that the MG2 speed-change part 360 is fixed to one speed-change ratio.

Characteristic lines for illustrating the respective rotational speeds according to the stepless speed-change mode are shown as illustrated PRF_CVTn (n=1, 2, 3) (refer to chain lines). In the stepless speed-change mode, the combustion rotational speed NE of the engine 200 can be continuously controlled by increasing or decreasing the MG1 rotational speed Nmg1. For example, when the output rotational speed Nout (i.e. uniquely regarded as the rotational speed of the drive shaft; namely, uniquely regarded as the vehicle speed) is an open circuit m1 illustrated, for example, if the MG1 rotational speed Nmg1 is sequentially changed to illustrated open circles m2, m3, and m4, the combustion rotational speed NE is sequentially changed to illustrated open circles m5, m6, and m7, which are a higher value, an equal value, and a lower value than the output rotational speed Nout, respectively.

Here, the characteristic illustrated in PRFCVT3 corresponds to a so-called overdrive state, in which the combustion rotational speed NE is lower than the output rotational speed Nout. If the overdrive state is realized in the stepless speed-change mode, the motor generator MG1 outputs the reaction torque (negative torque) of the engine torque in a negative rotation area, and the driving state thereof becomes a power-running state. On the other hand, on the motor generator MG2, in order to supply electricity to the MG1 in the power-running state (or to absorb the driving force outputted to the driving shaft 320 by power-running the MG1), the negative torque is outputted in a positive rotation area, and electricity is generated. As a result, if it is tried to realize the overdrive state in the stepless speed-change mode, the energy loss by the power circulation is hardly avoided depending on circumstances (in particular, in a high-rotation, light-load area).

On the other hand, in the condition that the clutch plates 351 and 352 of the clutch mechanism 350 engage with each other, the rotational speed of the clutch mechanism 350 is zero (refer to an open circle m8 illustrated), and the characteristic of the rotational speed of the power dividing mechanism 300 is in the state illustrated by PRF_OF (refer to a slid line). In other words, the combustion rotational speed NE of the engine 200 is fixed to a lower value than the output rotational speed Nout (refer to an open circle m9 illustrated). In other words, the speed-change ratio of the power dividing mechanism 300 is fixed to an overdrive speed-change ratio (i.e. one example of the "fixed speed-change ratio" of the present invention), so that the overdrive state is realized. In this state, the reaction torque is applied to the sun gear 341 from the clutch mechanism 350, and the sun gear 341 function as a reactive element. Thus, it is unnecessary to make the motor generator MG1 function as either the electric generator or the electric motor, and the motor generator MG1 is substantially idling. Thus, it is unnecessary to supply electricity to the motor generator MG1 from the motor generator MG2, and the power circulation can be avoided.

The speed-change mode of the hybrid vehicle 10 is normally determined to be one of the two types of speed-change modes that provides better fuel consumption (i.e. highly efficient), depending on an operational condition required for the hybrid vehicle 10 at that time or an actual operational condition or the like of the hybrid vehicle 10. For example, the overdrive state by the fixed speed-change mode is realized in high-speed, light-load travelling such as high-speed, steady travelling in which the operating point of the engine 200 is hardly set on the optimum fuel consumption line. These speed-change modes are changed, as occasion demands, by speed-change control performed by the ECU 100.

Now, with reference to FIG. 5, the details of the speed-change control will be explained. FIG. 5 is a flowchart showing the speed-change control.

In FIG. 5, the ECU 100 judges whether or not a running condition of the hybrid vehicle 10 is within a selecting area in which the fixed speed-change mode is selected (step S101). Here, the switch between the stepless speed-change mode and the fixed speed-change mode is judged on the basis of the vehicle speed V and the accelerator opening degree Ta that are respectively detected by a vehicle speed sensor and a sensor for accelerator opening degree not illustrated in FIG. 1. More specifically, the ECU 100 judges that the running condition of the hybrid vehicle 10 is within the selecting area for the fixed speed-change mode if a combination of the vehicle speed V and the accelerator opening degree Ta is within the predetermined high-speed light-load area preliminarily defined as an area in which it is possible to occur the aforementioned power circulation.

If the running condition of the hybrid vehicle 10 is not within the selecting area for the fixed speed-change mode (the step S101: NO), the ECU 10 judges whether or not the current speed-change mode is the fixed speed-change mode (step S105). If the stepless speed-change mode is currently selected (the step S105: NO), the ECU 100 performs a running control by the stepless speed-change mode as described above without switching the speed-change mode (step S107). On the other hand, if the fixed speed-change mode is currently selected (the step S105: YES), the ECU 100 makes the motor generator MG1 output the torque corresponding to the reaction torque so that the reaction torque applied to the clutch mechanism 350 become zero. Then, the ECU 100 releases the clutch plate 351 from the clutch plate 352 through a driving control for a driving assembly of the clutch mechanism 350 (step S106), and transfers the speed-change mode to the stepless speed-change mode. If the speed-change mode is transferred to the stepless speed-change mode, the processing transmitted to the step S107. When the processing of the step S107 is performed, the processing is returned to the step S101.

On the other hand, in the step S101, if the running condition of the hybrid vehicle 10 is within the selecting area for the fixed speed-change mode (the step S101: YES), the ECU 100 judges whether or not the current speed-change mode is the stepless speed-change mode (step S102). If the fixed speed-change mode is currently selected (the step S102: NO), the ECU 100 performs the running control by the fixed speed-change mode as described above without switching the speed-change mode (step S104). On the other hand, the stepless speed-change mode is currently selected (the step S102: YES), the ECU 100 performs a clutch engage preparing processing as will become apparent below (step S200). The clutch engage preparing process is a process of making clutch plates of the clutch mechanism 350 become the aforementioned rotation synchronization status and the aforementioned position synchronization status. The processing is ended in the stage in which clutch plates have become the rotation synchronization status and the position synchronization status.

After the clutch engage preparing process, the ECU 100 controls the drive assembly of the clutch mechanism 350, thereby the clutch plate 351 is shifted to the clutch plate 352. As a result, the clutch plates 351 and 352 are engaged with each other (step S103). Then, the running control by the fixed speed-change mode is started though transferring the reaction torque from the motor generator MG1 to the clutch mechanism 350 or the like (the step S104). When the processing of the step S104 is performed, the processing is returned to the step S101. The speed-change control is performed as described above.

Incidentally, in the process of transferring the reaction torque of engine torque from the sun gear 331 connected to the motor generator MG1 to the clutch plate 351 through the sun gear 341, the output torque of the motor generator MG1 is gradually decreased to the target torque being zero. More specifically, the ECU 100 sets an interim instruction torque by subtracting a predetermined variation from the value of a previously instruction torque, with respect to each predetermined processing cycle. Then, the ECU 100 gradually decreases the output torque of the motor generator MG1 through the control for the PCU 400. The reaction torque is gradually shouldered by the clutch mechanism 350 through the sun gear 341 with decrease of the output torque of the motor generator MG1. It becomes a state in which the reaction torque of the engine torque is entirely shouldered by the clutch mechanism 350, in the stage in which the output torque Trmg1 is controlled to zero as a target value.

Here, with reference to FIG. 6, the details of the clutch engage preparing process will be explained. FIG. 6 is a flowchart showing the clutch engage preparing process.

In FIG. 6, the ECU 100 calculates the clutch rotational speed Ncl on the basis of a pulse signal sent from the first rotation sensor 600 (step S201). After calculating the clutch rotational speed Ncl, the ECU 100 further judges whether or not the calculated clutch rotational speed Ncl (i.e. one example of the "detected first rotational speed" of the present invention) is larger than a predetermined criterion value Nclth (step S202). Incidentally, the criterion value Nclth will be described below.

If the calculated clutch rotational speed Ncl is larger than the criterion value Nclth (the step S202: YES), the ECU 100 performs the feedback control for restoring the clutch mechanism 350 to the rotation synchronization status and the position synchronization status on the basis of the calculated clutch rotational speed Ncl (step S203).

Now, with reference FIG. 7, the details of the feedback control will be explained. FIG. 7 is a schematic block diagram associated with the feedback control of this embodiment. Incidentally, in FIG. 7, the repeated points of FIG. 1 carry the same reference numerals, and the explanation thereof will be omitted as occasion demands. Incidentally, the block diagram illustrated in FIG. 7 is mainly the block diagram showing a part of the ECU 100, which relates to the feedback control.

In FIG. 7, the calculated clutch rotational speed Ncl is inputted to an integrator 101 so that an angle θcl of the clutch plate 351 (i.e. one example of "position" of the present invention) is calculated. The calculated angle θcl is inputted to a subtracter 102; the calculated angle θcl, and a target position θref inputted to the subtracter 102 are used for a subtracting process. A position deviation Δθ is outputted from the subtracter 102. The position deviation Δθ outputted from the subtracter 102 is further inputted to a position controller 103. Then, after multiplying the position deviation Δθ by a predetermined position-gain, the position deviation Δθ inputted to an adder 105.

On the other hand, the calculated clutch rotational speed Ncl is inputted to a subtracter 104; the calculated clutch rotational speed Ncl and a target rotational speed Ntg (in this embodiment, it is zero) are used for a subtracting process. A speed deviation ΔNcl is outputted from the subtracter 104. The speed deviation ΔNcl outputted form the subtracter 104 is inputted to the adder 105. Then, after multiplying the speed deviation ΔNcl by an output value outputted from the position controller 103, the speed deviation ΔNcl is inputted to a speed controller 106.

In the speed controller 106, an output value outputted from the adder 105 is multiplied by a predetermined speed-gain, thereby an instruction torque Tref for the motor generator MG1 is calculated. The motor generator MG1 is controlled on the basis of the instruction torque Tref in order to drive the motor generator MG1. The result of the aforementioned drive control, the aforementioned feedback loop is repeated by changing the clutch rotational speed Ncl.

Incidentally, the block diagram illustrated in FIG. 7 is only one example. The feedback control for the rotation synchronization and the position synchronization may be performed on the basis of various feedback models widely known. Moreover, in the illustrated block diagram in FIG. 7, a control loop for rotational speed and a control loop for position are combined. However, a feedback control for rotational speed and a feedback control for a position may be performed independently.

Here, the first rotation sensor 600 is a rotary encoder sending a pulse signal in accordance with rotational speed of a detecting body. If the number of pulse signals, which are sent from the sensor in a predetermined cycle (i.e. unit time) in which the ECU 100 refers the pulse signals, is not enough, detection accuracy of the clutch rotational speed Ncl reduces. If the detection accuracy of the clutch rotational speed Ncl reduces, accuracy of an output signal outputted from the subtracter 104 reduces. As a result, since accuracy of the instruction torque Tref as an output value of the speed controller 106 reduces, convergence times for the rotation synchronization and the position synchronization will be lengthened. Or, the clutch engage preparing process will end in a condition in which the rotation and position synchronization for clutch plates are not enough. In this case, anyhow, the drivability or reliability in the hybrid vehicle 10 will reduce markedly.

Here, especially, since the number of pulse signals outputted from the first rotation sensor 600 decreases in accordance with decreasing the clutch rotational speed Ncl, possibility for the aforementioned trouble is relatively high in the low rotational range. Particularly, as this embodiment, if the clutch plate 351 is physically fixed and the target rotational speed for the clutch rotational speed Ncl is zero or the like, it is necessary to take some measures. The criterion value Nclth as described above is a value defining an area, which relates to the clutch rotational speed Ncl, in which the detection accuracy of the clutch rotational speed Ncl is reduced to the extent that the aforementioned trouble occurs. In this embodiment, the criterion value Nclth is set a value belonging to an extremely low rotational range in the vicinity of zero.

Back in FIG. 6, if the calculated clutch rotational speed Ncl is less than or equal to the criterion value Nclth (the step S202: NO), the ECU 100 conforms an original position for the position control in the second rotation sensor 700 to that in the third rotation sensor 800 (step S204). Additionally, the ECU 100 estimates the clutch rotational speed Ncl on the basis of the MG1 rotational speed Nmg1 detected by the second rotation sensor 700 and the MG2 rotational speed Nmg2 detected by the third rotation sensor 800 in place of the first rotation sensor 600 (step S205). Then, the ECU 100 starts the feedback control based on the estimated clutch rotational speed Ncl (i.e. one example of the "estimated first rotational speed" of the present invention) (step S206). Incidentally, the conformation of original positions is discussed below.

The power dividing mechanism 300 is provided with the plurality of rotational elements which mutually cause the differential operation, as described above. If the rotational speeds of two elements of the plurality of rotational elements are determined, the rotational speed the remaining element is automatically determined. Therefore, it is possible to estimate the clutch rotational speed Ncl easily by a numerical arithmetic processing based on the MG1 rotational speed Nmg1 and the MG2 rotational speed Nmg2 as parameters, and the gear ratio between rotational elements of the power dividing mechanism 300 (it is already-known) (the details of this processing is omitted because it is widely known; this processing expresses the relationship illustrated in FIG. 4 as a numerical function). Especially, as is obvious from FIG. 4, if the clutch rotational speed Ncl is vicinity zero, absolute values of the MG1 rotational speed Nmg1 and the MG2 rotational speed Nmg2 is enough larger than the clutch rotational speed Ncl. Therefore, the estimated clutch rotational speed Ncl has reliability which is higher than reliability of the calculated clutch rotational speed Ncl based on pulse signal of the first rotation sensor 600. Consequently, it is possible that the reduction in convergent in the feedback control is restrained.

Back in FIG. 6, the ECU 100 judges whether or not the rotation synchronization and the position synchronization are completed (step S207). If the rotation synchronization and the position synchronization are not completed (the step S207: NO), the processing is returned to the step S205, and the series of processes is repeated. If the rotation synchronization and the position synchronization are completed (the step S207: YES), the clutch engage preparing process is ended. In this embodiment, the clutch engage preparing process is performed as described above.

Here, with reference to FIG. 8, the status of each of rotation sensors in the processes of steps S204 to S206 will be explained. FIG. 8 is a schematic diagram explaining an operation status of each rotation sensor.

In FIG. 8, the FIG. 8(a) shows a timing diagram indicating an operation status of the first rotation sensor 600; the FIG. 8(b) shows a timing diagram indicating an operation status of the second rotation sensor 700; and the FIG. 8(c) shows a timing diagram indicating an operation status of the third rotation sensor 800. The vertical axis and the horizontal axis of each of timing diagrams indicate an integral value of pulse signals and time, respectively.

In FIG. 8(a), through the time T0 to the time T2, since an obtaining cycle of a pulse signal is less than an upper limit (i.e. a cycle corresponding to the criterion value Nclth), no trouble occurs. It is assumed that a cycle $\Delta T$, when it is a period from obtaining a pulse signal at the time T2 to obtaining a pulse signal at the time T3, exceeds an acceptable value (i.e. it is assumed that the calculated clutch rotational speed Ncl exceeds the criterion value Nclth, in this state). In FIG. 8, the time T3 is a timing for switching the clutch rotational speed Ncl as the reference value, which is referred in performing the feedback control, from the calculated clutch rotational speed Ncl to the estimated clutch rotational speed (refer to the illustrated an open circle m). At this switching timing, focus attention on status of other rotation sensors (refer to the illustrated open circles m), obtaining cycles of the second and third rotation sensor 700 and 800 are enough short, thereby reliability of each of detected rotational speeds is warranted.

As described above, according to this embodiment, it is possible to switch the reference value of the clutch rotational speed Ncl, which is referred in performing the feedback control for realizing the rotational synchronization and the position synchronization corresponding to the clutch plate 351 in the clutch engage preparing process, between the calculated value based on the pulse signal of the first rotation sensor 600 and the estimated value based on the pulse signals of the second and third rotation sensor 700 and 800 in accordance with the clutch rotational speed Ncl. Thus it is possible to restore engagement elements of the clutch mechanism 350 to the rotation synchronization status and the position synchronization status, rapidly and accurately. Therefore, it is possible that the reduction in drivability and reliability in the hybrid vehicle 10 is restrained.

On the other hand, when the rotation synchronization is only needed in engaging engagement elements of the clutch mechanism 350 with each other, it is not needed to define a switching timing (e.g. the time T3 in FIG. 7), strictly. However, when an engaging device needs the position synchronization such as the clutch mechanism 350, the switching timing is important.

In other words, when the rotational speed of the clutch plate 351 is not zero, the clutch plate 351 measurably rotates to a direction which is defined in accordance with rotation status of motor generators MG1 and MG2. Therefore, the position control must be performed continuously on a time axis in order to perform the position synchronization. If it is not performed that way, the rotation angle of the clutch plate 351 is unknown. At this time, if the position control is performed on the basis of the pulse signal outputted from the first rotation sensor 600, according to circumstances (i.e. as long as a pulse signal corresponds to a rotation angle), it is possible to resume the position control even if the position control is performed discontinuously on the time axis. However, after switching the reference value for the clutch rotational speed Ncl to the estimated clutch rotational value, the position control for the clutch plate 351 is difficult because position relationships between each of motor generators and the clutch plate 351 are originally not unique.

Consequently, in the step S204, the ECU 100 conforms an original position for the position control in the second rotation sensor 700 to that in the third rotation sensor 800. Refer to FIG. 8, the position control by using the pulse signal outputted from the first rotation sensor 600 is performed until the time T3. The time T3 is the switching timing for the reference value, thereby each of rotation angles defined by pulse signals of the second and third rotation sensor is set as a new original position. After the time T3, the position control based on the estimated clutch rotational speed Ncl is started.

Here, in FIG. 8, each of the first to third rotation sensors outputs a pulse signal at the time T3, thereby it is relatively easy to perform the processing of the conformation of original positions as described above. However, this is only one example; in many cases, an obtain timing when a pulse signal is obtained in each of rotation sensors is different from each other. Therefore, if the feedback loop for the position control is processed at the obtain timing of a pulse signal, the original position for the position control based on the estimated clutch rotational speed Ncl will be misalign.

In order to tackle the aforementioned problem, the ECU 100, for example, may perform a correction processing as follows: a correction processing for an integration operation in the integrator 101 on the basis of a time value which indicates time length from the switching timing for the reference value until a timing when a pulse signal is obtained for the first time after the switching timing (in this case, this is the original position); a correction processing for rotational speeds of motor generators calculated on the basis of an obtained pulse signal. Alternatively, the ECU 100 may switch the reference value at a time when output timing of a pulse signal outputted from each of rotation sensors conforms to each other after a time when the calculated clutch rotational speed Ncl is less than the criterion value Nclth (in this case, the criterion value Nclth may be set relatively a high rotational side in view of safety). Anyhow, as long as the integration operation for the position control is performed continuously on the time axis, the ECU 100 may take various measures. Moreover, anyhow, this type of measures are in the category of the operation of the switching control device for "configuring an original position which defines standard for the position control for the second detecting device to start the position control, which refers the estimated first rotational speed, in synchronization with a switching time point" of the present invention.

The present invention is not limited to the embodiments described above. The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosures of Japanese Patent Application No. 2008-189824 filed on Jul. 23, 2008 including the specification, claims, drawings and summary are incorporated herein by reference in their entireties.

What is claimed is:

1. A control apparatus for a hybrid vehicle which comprises an internal combustion, a first electric motor and a second motor connected to a driving shaft as a power source, and which comprises an engaging device comprising a first and a second engagement elements which can engage with each other under a rotation synchronization status, a first detecting device for being capable of detecting first rotational speed as rotational speed of the first engagement element, a power dividing device comprising a plurality of rotational elements being adapted to mutually perform differential rotation, which includes a first rotational element connected to an output shaft of the internal combustion, a second rotational element connected to an output shaft of the first electric motor, a third rotational element connected to an output shaft of the second electric motor, and a fourth rotational element connected to the first engagement element, and a second detecting device for being capable of detecting second rotational speed as rotational speed corresponding to other rotational elements of the plurality of rotational elements except the fourth rotational element, said hybrid vehicle being performed feedback control in order to converge the first rotational speed at target rotational speed corresponding to the rotation synchronization status in engaging the first engagement element with the second engagement element, said control apparatus comprising:

a judging device for judging whether or not the detected first rotational speed is within a predetermined low rotational range;

a estimating device for estimating the first rotational speed on the basis of the detected second rotational speed if it is judged that the detected first rotational speed is within the predetermined low rotational range; and a switching control device for switching the first rotational speed, which is referred to in determining a feedback control amount in the feedback control, from the detected first rotational speed to the estimated first rotational speed if it is judged that the detected first rotational speed is within the predetermined low rotational range.

2. The control apparatus for hybrid vehicle according to claim 1, wherein said judging device judges the detected first rotational speed is within the predetermined low rotational range if the detected first rotational speed is less than a predetermined criterion value.

3. The control apparatus for hybrid vehicle according to claim 1, wherein the first and second engagement elements are adapted to be capable of engaging each other under a position synchronization status, a position control for the first engagement element is performed in the feedback control on the basis of the referred first rotational speed to restore the first and second engagement elements to the position synchronization status, and said switching control device configures an original position which defines standard for the position control for said second detecting device to start the position control, which refers the estimated first rotational speed, in synchronization with a switching time point in switching the referred first rotational speed to the estimated first rotational speed.

4. The control apparatus for hybrid vehicle according to claim 1, wherein said hybrid vehicle adopts a stepless speed-change mode which can continuously change a rotational speed ratio between the output shaft of the internal combustion and the driving shaft as a speed-change mode by that the second rotational element has reaction torque of output torque of the internal combustion if said engaging device is in a release state in which the first engagement element is released from the second engagement element, and adopts a fixed speed-change mode which fixes the rotational speed ratio to a predetermined value as the speed-change mode by that rotation of the first engagement element is blocked and that the fourth rotational element has the reaction torque if said engaging device is in an engagement state in which the first engagement element engages with the second engagement element.

* * * * *